Sept. 2, 1952            L. B. CARTER            2,609,247
DEVICE FOR ATTACHING AUXILIARY WHEELS TO TRACTORS
Filed April 21, 1949            2 SHEETS—SHEET 1
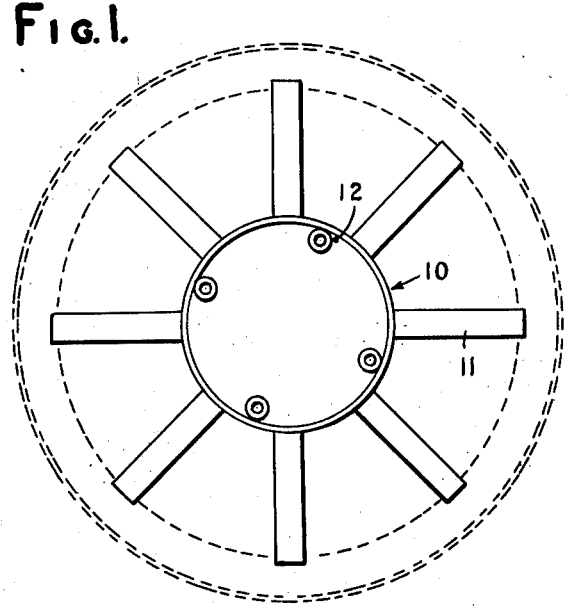
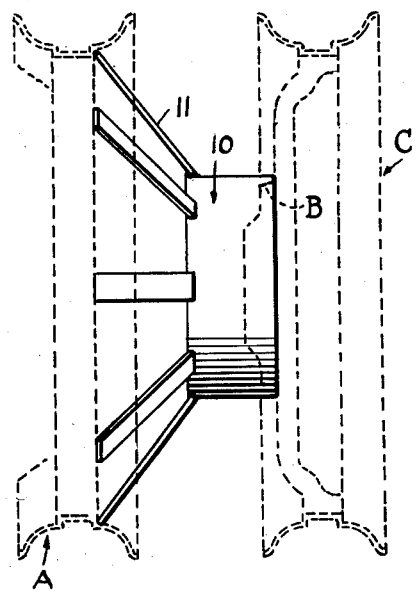
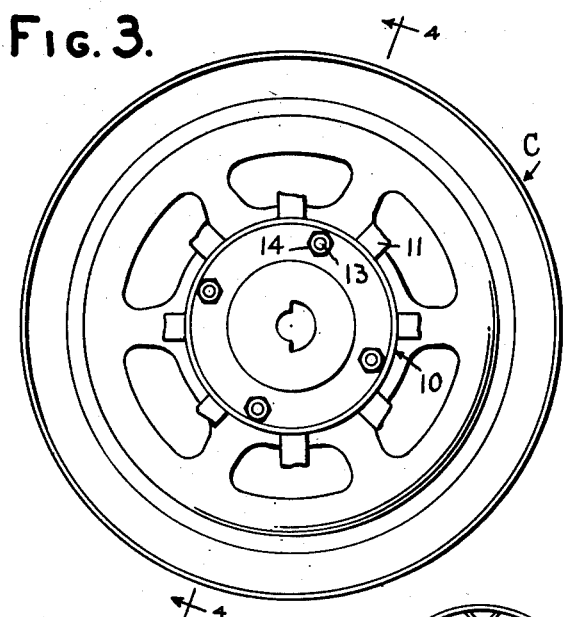
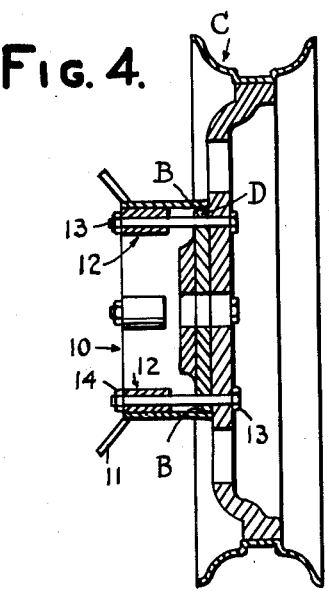
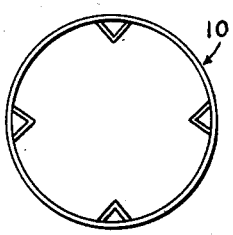
INVENTOR.
LYNN B. CARTER
BY Emery, Holcombe & Blair
ATTORNEYS Sept. 2, 1952 L. B. CARTER 2,609,247
DEVICE FOR ATTACHING AUXILIARY WHEELS TO TRACTORS
Filed April 21, 1949 2 SHEETS—SHEET 2

INVENTOR.
LYNN B. CARTER
BY Emery, Holcombe & Blair
ATTORNEYS

Patented Sept. 2, 1952

2,609,247

UNITED STATES PATENT OFFICE 2,609,247

DEVICE FOR ATTACHING AUXILIARY WHEELS TO TRACTORS

Lynn B. Carter, Grand Forks, N. Dak.

Application April 21, 1949, Serial No. 88,704

3 Claims. (Cl. 301—38)

This invention relates to a device for attaching auxiliary wheels to tractors. Under certain conditions it becomes desirable to attach to each of the rear wheels of agricultural tractors an additional or auxiliary wheel to distribute the weight of the machine over a broader surface and secure better traction. The decision to do this is normally arrived at on the basis of local or temporary conditions, and conseqently the wheels are usually attached by the farmers themselves, individual retailers selling the auxiliary wheels, or by local blacksmiths. Under these circumstances it is highly desirable that some device be developed by means of which these auxiliary wheels can be attached quickly and easily with simple tools readily available, and it is of the utmost importance that the attachment fit all principal types of tractor.

In general, there are two standard styles or types of tractor wheels. These may be exemplified by the McCormick-Deering wheel, which carries a solid outer flange with round bolt-holes, as shown in Figures 3 and 4, and the John Deere wheel, which has T-shape lug receiving apertures, as shown in Figures 7 and 8, for attaching wheel weights. By reason of the different contours of these two types of wheel it has heretofore been necessary to use entirely different means for attaching auxiliary wheels to them. I have, however, devised an attachment which will serve with either type of wheel, and which is very simple to use and inexpensive to manufacture.

Other objects of the invention are in part obvious and will in part be set forth in connection with the following description.

In the drawings:

Figure 1 is a plan view showing the outer face of my new attaching device;

Figure 2 is a side view showing my invention in full lines with a flange type vehicle wheel and auxiliary wheel in dotted lines;

Figure 3 is a face view showing my invention in place against a flanged wheel, with the outer portions of the spokes broken away;

Figure 4 is a cross-sectional view taken along the line 4—4 of Figure 3;

Figure 5 shows an alternative form of bolt channel mounted in the rim of the attaching device;

Figure 6:
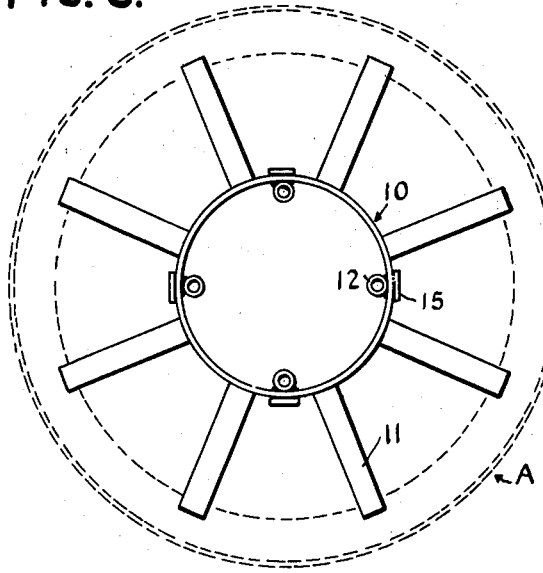
Figure 6 is a face view showing the outer face of a modified form of my invention.
Figure 8:
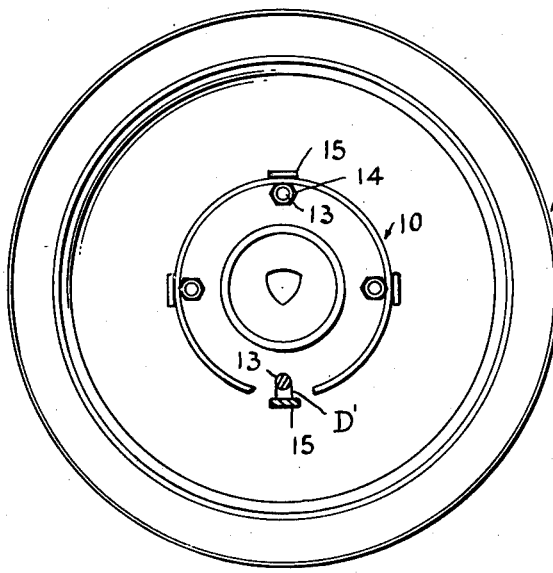
Figures 9, 10:
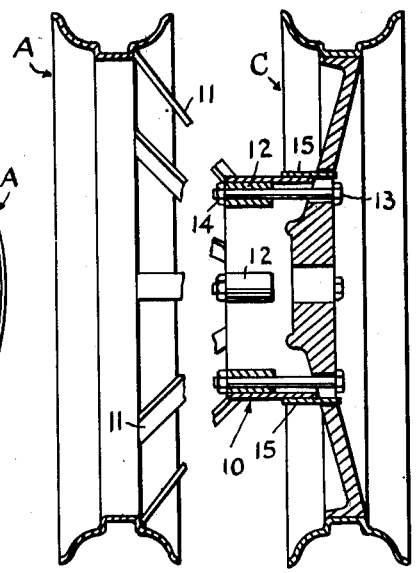

Figure 8 is a face view showing the drum of my invention in place on a wheel of the same type with a small portion in section to show the shape of the lug-receiving apertures; and Figures 9 and 10 constitute a broken cross-sectional view showing the embodiment of Figure 6 connecting an auxiliary wheel to a wheel having lug-receiving apertures, the section being taken through the axis of rotation of the invention.

Referring in detail to the drawings, a cylindrical drum 10 carries radiating spokes 11, adapted to be welded at their outer ends to the rim A of an auxiliary wheel. Bolt channels 12 are fixed to the inside of the drum 10 and extend from its spoke edge towards its inner edge. Attachment of an auxiliary wheel with this device is relatively simple. First, the spokes are welded to the rim of the auxiliary wheel. Then in the case of a McCormick-Deering wheel having an exterior flange, as shown in Figure 2, the drum is fitted over the solid flange B on the tractor wheel C, bolts 13 are inserted in the channels and passed through the holes D in the flange B. Nuts 14 are placed on the bolts and turned tight. The holes D are a standard feature on this type of tractor wheel. Advantageously the average inside diameter of the drum is slightly less than the external diameter of the flange, but the drum flares slightly at edge away from the spokes, so that it may be driven over the frusto-conical flange for a close fit.

Figure 7:
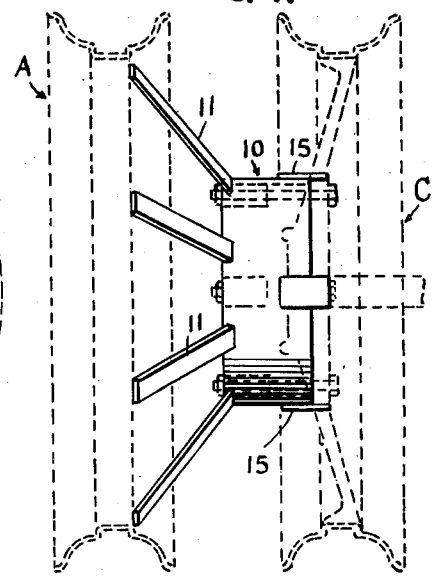
Figure 7 is a side view showing the embodiment of Figure 6 connecting an auxiliary wheel to a tractor wheel having lug receiving apertures, the two wheels being shown in dotted lines.

If an auxiliary wheel is to be attached to a John Deere unit, as shown in Figure 7 the drum 10 is placed against the wheel C, with the bolt channels 12 registering with the inner portion of the T-shaped lug receiving holes D' which are standard on this type of tractor wheel. Bolts 13 are inserted in the channels 12 and passed through the lug holes D'; nuts 14 are threaded on and turned tight. This makes a satisfactory and rigid attachment, but if greater strength is desired, additional supporting lugs 15 may be welded on the outside of the cylinder, opposite the bolt channels, before the cylinder 10 is attached to the wheel. These lugs will fit in the outer portion of the lug receiving holes D' through the inner ends of which the bolts have been passed. From a commercial point of view, the device may be sold to dealers without the lugs 13 attached, but a number of them included loose with large orders. Then any individual preferring to use the lugs will be given a suitable supply by the retailer and can weld them in place at the same time the spokes are welded to the rim of the auxiliary wheel. Of course, the auxiliary wheels may be sold with the attachment already welded in place. In this case, all the customer has to do is bolt the attachment to the tractor wheel, and he is ready to go.

It will be appreciated that the channel for the bolts can be made in many ways; for instance, it may comprise tubing welded on to the drum, as shown in Figure 1, angle iron welded in place, as shown in Figure 5, or simply a series of small annular supports at appropriate intervals. It will accordingly be understood that I do not desire to limit the application of this invention to the particular modifications set out herein to illustrate the principle thereof, and changes may be made in material, structure and arrangement of parts consistent with the spirit and scope of the invention.

What I claim is:

1. A device for attaching an auxiliary wheel to a tractor road wheel of the type having round bolt holes radially spaced about the center of the road wheel and a flange extending outwardly from the surface of said wheel outwardly of said bolt holes, as well as to a tractor road wheel of the type having a plurality of T-shaped lug holes radially spaced about the center of the wheel, said device comprising an open ended cylindrical drum, a plurality of individual spokes radiating from one edge of said drum and adapted to be secured at their outer extremeties to the rim of an auxiliary wheel, and axial bolt channels secured to the inner surface of said drum, the diameter of said drum being such that its inner edge is adapted to fit snugly about the flange of a flange-carrying tractor wheel so as to grip said flange, and both inner and outer edges of said drum intersect the lug holes of a tractor wheel of the same size having lug holes, so that the ends of said bolt channels register with the innermost portions of said lug holes while the outermost portions of said lug holes extend radially beyond the outer edge of said drum.

2. A device as claimed in claim 1 in which said bolt channels extend axially from the spoke-carrying edge of the drum to a point spaced from the opposite edge of the drum by a distance equal to the height of the flange on a flange-carrying wheel and in which the interior surface of the drum is substantially perpendicular to the plane of its open ends where said interior surface meets said ends so as to form a socket for said flange.

3. A device for attaching auxiliary wheels to the road wheels of tractors, said road wheels being provided with holes concentrically spaced about the axis of rotation of said wheels, said device comprising in combination a cylindrical drum, a plurality of individual spokes radiating from one edge of said drum and adapted to be secured at their outer extremeties to the rim of an auxiliary, wheel and axial bolt channels on the inner surface of said drum spaced around its periphery at equal distances corresponding to the spacing of said road wheel holes, together with supporting lugs carried on the exterior of said drum opposite said bolt channels and extending axially beyond the outer edge of said drum.

LYNN B. CARTER.

REFERENCES CITED

The following references are of record in the file of this patent:

UNITED STATES PATENTS

| Number | Name | Date |
| --- | --- | --- |
| 1,032,757 | Jones | July 16, 1912 |
| 1,200,255 | Steele | Oct. 3, 1916 |
| 1,327,607 | Baker | Jan. 13, 1916 |
| 1,710,058 | Jernberg | Apr. 23, 1929 |
| 1,904,081 | Pratt | Apr. 18, 1933 |
| 1,948,136 | Scheckler | Feb. 20, 1934 |
| 2,447,225 | Bennet | Aug. 17, 1948 |

FOREIGN PATENTS

| Number | Country | Date |
| --- | --- | --- |
| 471,293 | Germany | Mar. 5, 1927 |